United States Patent
Warke et al.

(10) Patent No.: US 8,837,561 B2
(45) Date of Patent: Sep. 16, 2014

(54) INITIALIZATION SEQUENCE FOR BI-DIRECTIONAL COMMUNICATIONS IN A CARRIER-BASED SYSTEM

(71) Applicant: Texas Instruments Incorporated, Dallas, TX (US)

(72) Inventors: Nirmal C. Warke, Irving, TX (US); Bradley A. Kramer, Plano, TX (US); Robert F. Kramer, Lucas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 63 days.

(21) Appl. No.: 13/683,826

(22) Filed: Nov. 21, 2012

(65) Prior Publication Data

US 2014/0140380 A1    May 22, 2014

(51) Int. Cl.
*H04L 5/16* (2006.01)
*H04L 7/10* (2006.01)

(52) U.S. Cl.
CPC .................................... *H04L 7/10* (2013.01)
USPC ........................................................ 375/219

(58) Field of Classification Search
CPC ... H04B 1/40; H04L 27/2273; H04L 27/2631
USPC .......... 375/219, 260, 316, 344, 345; 370/210; 455/226, 337
See application file for complete search history.

(56) References Cited

U.S. PATENT DOCUMENTS

| | | | |
|---|---|---|---|
| 2010/0316158 A1* | 12/2010 | Arne | 375/285 |
| 2012/0195184 A1* | 8/2012 | Dapper et al. | 370/210 |
| 2012/0257694 A1* | 10/2012 | Balakrishnan | 375/340 |

* cited by examiner

*Primary Examiner* — Khai Tran
(74) *Attorney, Agent, or Firm* — John R. Pessetto; Frederick J. Telecky, Jr.

(57) ABSTRACT

A method is provided. An initial bit sequence is received by a receiver. A local oscillator is locked initially to a local reference and subsequently to the received signal using the initial bit sequence, and automatic gain control (AGC) is performed once the local oscillator is locked to the local reference. A Costas loop is then activated so as to achieve carrier frequency offset (CFO) lock, and sign inversion is detected. The receiver then synchronized with an end-of-training pattern.

14 Claims, 6 Drawing Sheets

COLUMNS 1 THROUGH 26
1 1 0 0 0 0 1 0 1 0 0 0 1 0 0 0 1 1 1 1 0 0 1 0 1 1

COLUMNS 27 THROUGH 52
0 0 1 1 1 0 1 0 1 0 0 1 1 1 1 1 0 1 0 0 0 0 1 1 1 0

COLUMNS 53 THROUGH 78
0 0 1 0 0 1 0 0 1 1 0 1 1 0 1 0 1 1 0 1 1 0 1 1 0 1

COLUMNS 79 THROUGH 104
0 0 1 1 0 1 0 0 0 1 0 1 1 1 0 1 1 1 0 0 1 1 0 0 1 0

COLUMNS 105 THROUGH 127
1 0 1 0 1 1 1 1 1 1 1 0 0 0 0 1 0 0 0 0 0 0 0

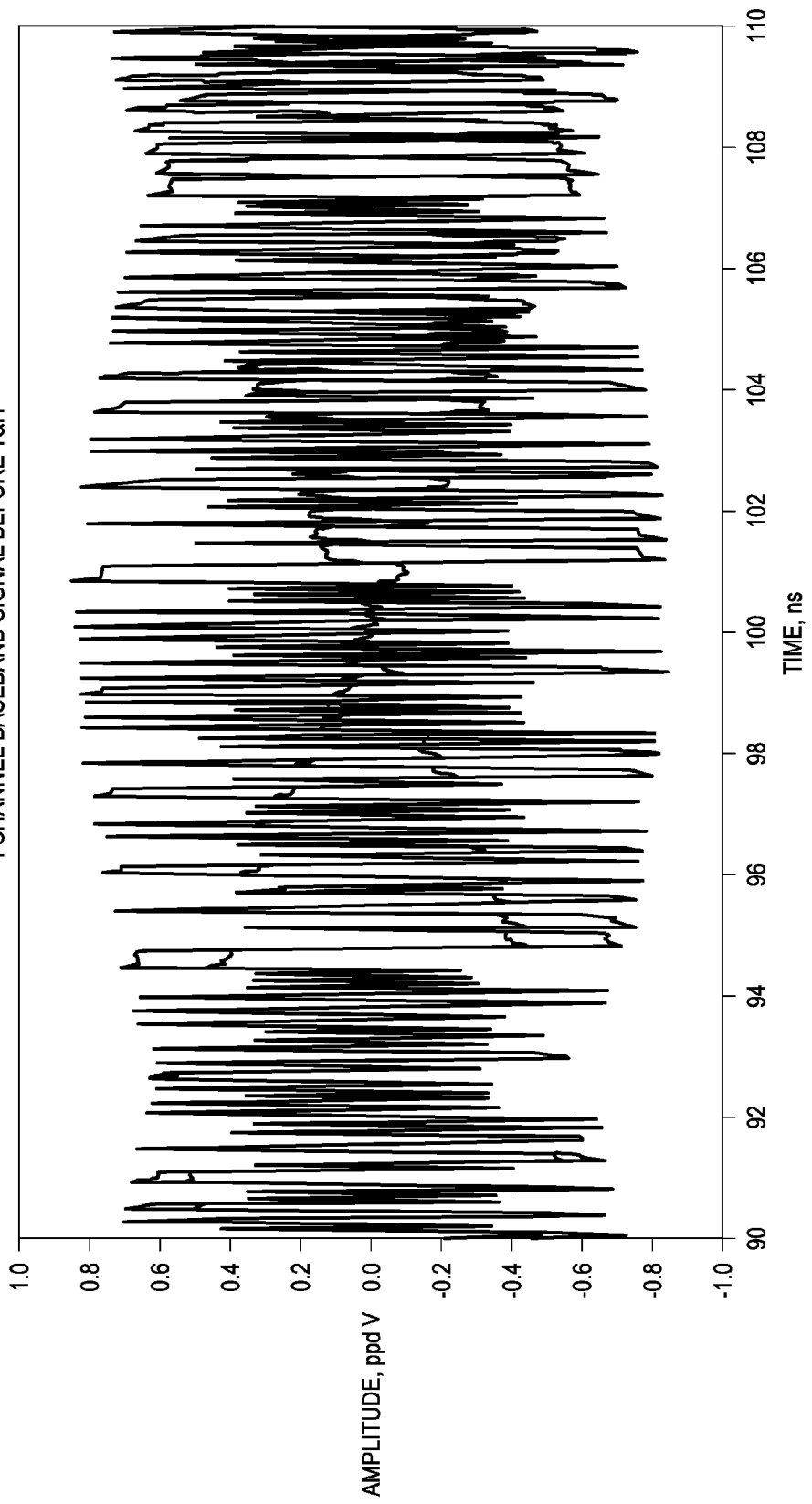

INITIALIZATION SEQUENCE FOR BI-DIRECTIONAL COMMUNICATIONS IN A CARRIER-BASED SYSTEM

TECHNICAL FIELD

The invention relates generally to a communications system and, more particularly, to an amplitude and phase modulated communication system.

BACKGROUND

Communications between remote modems is commonplace in many applications. Depending on the type of system, though, there may or may not be an initialization sequence that can synchronize the remote modems. For example, startup in an electrical or optical serializer/deserializer (SerDes) system is blind, meaning that there is no initialization sequence. Wireless systems (i.e., cellular communications system), on the other hand, have and usual require an initialization sequence, which occur during fixed training periods. A problem with these types of initialization sequences is that the sequence is fixed and not dependent on the state of the remote receiver, causing a loss in robustness. Therefore, there is a need for an initialization sequence for a communications system that is dependent on the state of the receiver.

Some examples of conventional systems are: U.S. Pat. No. 8,081,948; U.S. Patent Pre-Grant Publ. No. 2011/0122932; and PCT Publ. No. WO2012074551.

SUMMARY

In accordance with the present invention, a method is provided. The method comprises locking a local oscillator to a local reference signal; performing automatic gain control (AGC) on a specially designed initialization sequence from the transmitter; activating a Costas loop modified for the special initialization sequence so as to achieve carrier frequency offset (CFO) lock; detecting sign inversion; and synchronizing the receiver with an end-of-training pattern.

In accordance with the present invention, the method further comprises performing clock and data recover (CDR) prior to the step of activating the Costas loop.

In accordance with the present invention, the step of synchronizing further comprises detecting the end-of-training pattern.

In accordance with the present invention, the receiver further comprises a transceiver, wherein the receiver is operating in a first communications mode prior to the step of synchronizing, and wherein the step of synchronizing further comprises: switching to a second communication mode by the transceiver; and transmitting an end-of-sequence pattern.

In accordance with the present invention, the first and second end-of-training patterns are the same pattern.

In accordance with the present invention, the first communications mode is a binary phase-shift keying (BPSK), and wherein the second communications mode is quadrature amplitude modulation (QAM).

In accordance with the present invention, the initial bit sequence is based on a pseudorandom bit sequence (PRBS) signal.

In accordance with the present invention, the PRBS signal is a PRBS7 signal, and wherein the second communications mode is 16-QAM.

In accordance with the present invention, a method is provided. The method comprises performing an initialization between a transmitter and a receiver over a wireless link by: transmitting an initial bit sequence by the transmitter; receiving the initial bit sequence by a receiver; locking the local oscillator to a local reference signal; performing ADC; activating a Costas loop so as to achieve carrier lock based on the initial bit sequence; detecting sign inversion by the receiver; and synchronizing the receiver with the transmitter with an end-of-training pattern; and communicating data from between the transmitter and the receiver over the wireless link.

In accordance with the present invention, the transmitter further comprises a first transceiver, and wherein the receiver further comprises a second transceiver, and wherein the end-of-training pattern further comprise a first transceiver end-of-training pattern, and wherein the first and second transceivers are operating in a first communications mode prior to the step of synchronizing, and wherein the step of synchronizing further comprises: switching to a second communication mode by the second transceiver; and transmitting a second transceiver end-of-sequence pattern to the first transceiver.

In accordance with the present invention, an apparatus is provided. The apparatus comprises a receiver having a local oscillator, an in-phase (I) channel, and a quadrature (Q) channel, wherein the receiver is configured to receive an initial bit sequence, and wherein the local oscillator is configured to be locked initially to a local reference and subsequently to a received signal using the initial bit sequence; a baseband circuit having: a first equalizer that is coupled to the I channel; a second equalizer that is coupled to the Q channel, wherein the first and second equalizers are configured to perform AGC once the local oscillator is locked to the local reference; a Costas loop that is coupled to the first and second equalizers, wherein the Costas loop is configured to achieve CFO; a first analog-to-digital converter (ADC) that is coupled to the first equalizer; a second ADC that is coupled to the second equalizer; a first verifier that is coupled to the first ADC; and a second verifier that is coupled to the second ADC, wherein the first and second verifiers are configured to detect sign inversion.

In accordance with the present invention, wherein the first equalizer further comprises: a first continuous-time linear equalizer (CTLE) that is coupled to the I channel; a first sample-and-hold (S/H) circuit that is coupled to the first CTLE; and a first filter that is coupled to the first S/H circuit; and wherein the second equalizer further comprise: a second CTLE that is coupled to the Q channel; a second S/H circuit that is coupled to the second CTLE; and a second filter that is coupled to the second S/H circuit.

In accordance with the present invention, the baseband circuit further comprises: a clocking circuit that is coupled to the first and second S/H circuits; and a clock-data recovery circuit that is coupled to the clocking circuit, the first filter, and the second filter.

In accordance with the present invention, the apparatus further comprises a transmitter that is coupled to the baseband circuit.

BRIEF DESCRIPTION OF THE DRAWINGS

For a more complete understanding of the present invention, and the advantages thereof, reference is now made to the following descriptions taken in conjunction with the accompanying drawings, in which:

FIG. 6 is a diagram depicting an example the baseband in-phase (I) and quadrature (Q) channels.

DETAILED DESCRIPTION

Figure 1:
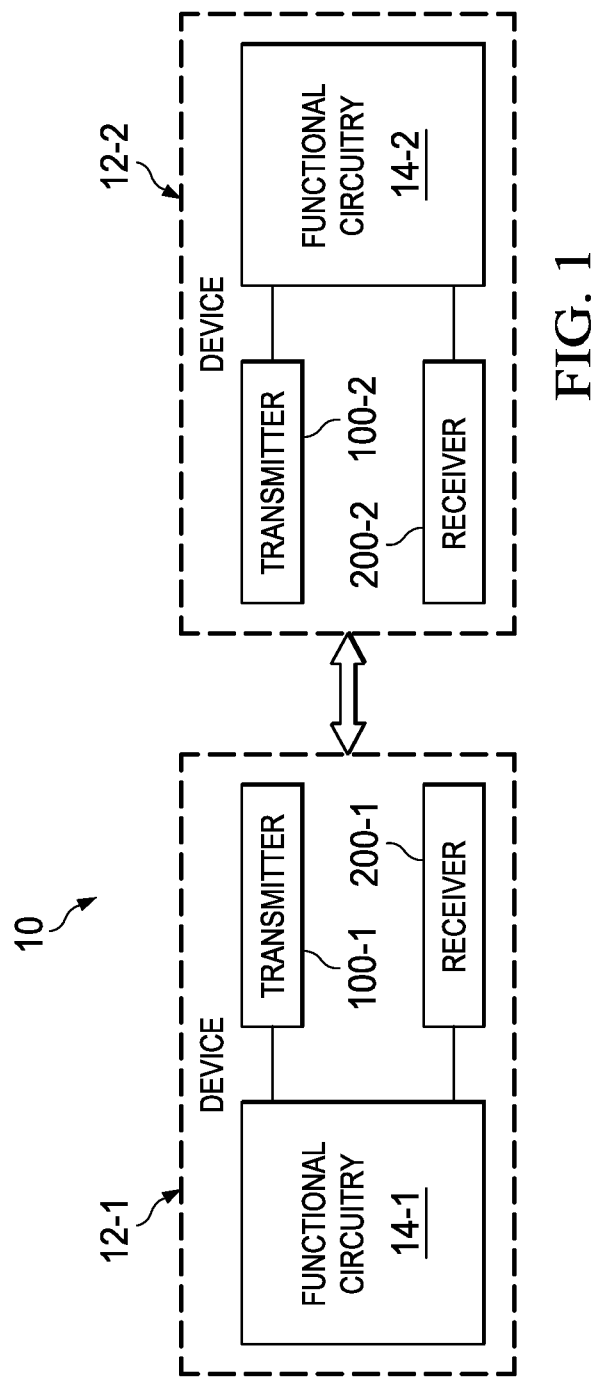
FIG. 1 is a diagram of an example of a communications system in accordance with the present invention.

Refer now to the drawings wherein depicted elements are, for the sake of clarity, not necessarily shown to scale and wherein like or similar elements are designated by the same reference numeral through the several views.

Turning to FIG. 1, an example of a communications system 10 can be seen. As shown, the system 10 generally comprises devices 12-1 and 12-2 that are able to communication with one another over a communications link. Typically, the communications link is a wireless link that employs millimeter waves (i.e., wavelengths between about 0.1 mm and 10 mm). These devices 12-1 and 12-2 can include a variety of devices (such as boards within a router) which have functional circuitry 14-1 and 14-2 (e.g., processors and memory). For communicating with one another, each device 12-1 and 12-2 can be equipped with a transceiver (i.e., transmitters 100-1 and 100-2 and receivers 200-1 and 200-2) to allow bi-directional communications that function as an IO system. One of the transmitter or receiver can be omitted for unidirectional communications.

Figure 2:
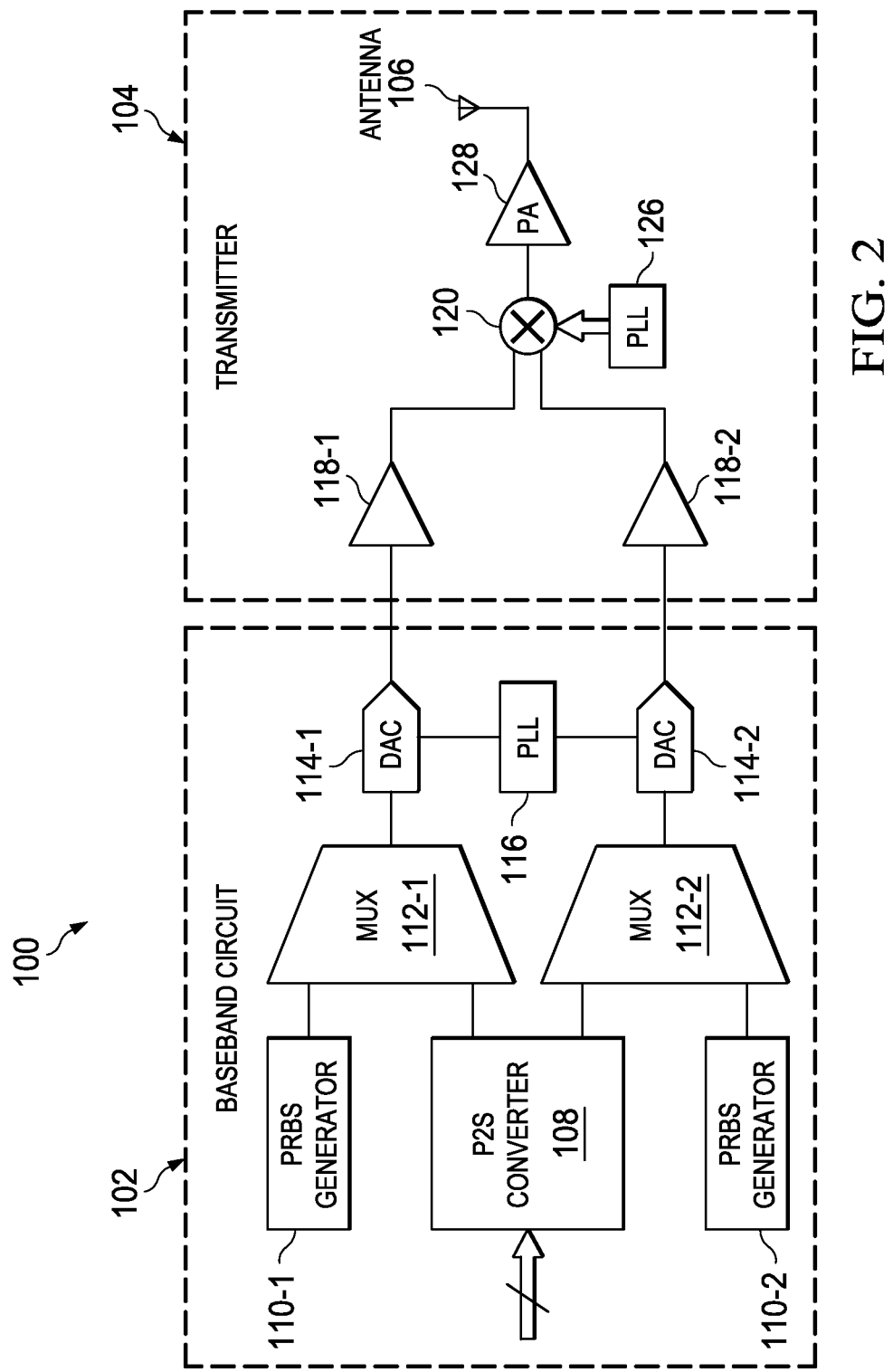
FIGS. 2 and 3 are diagrams of an example of input/output (IO) system for the system of FIG. 1.
Figure 3:
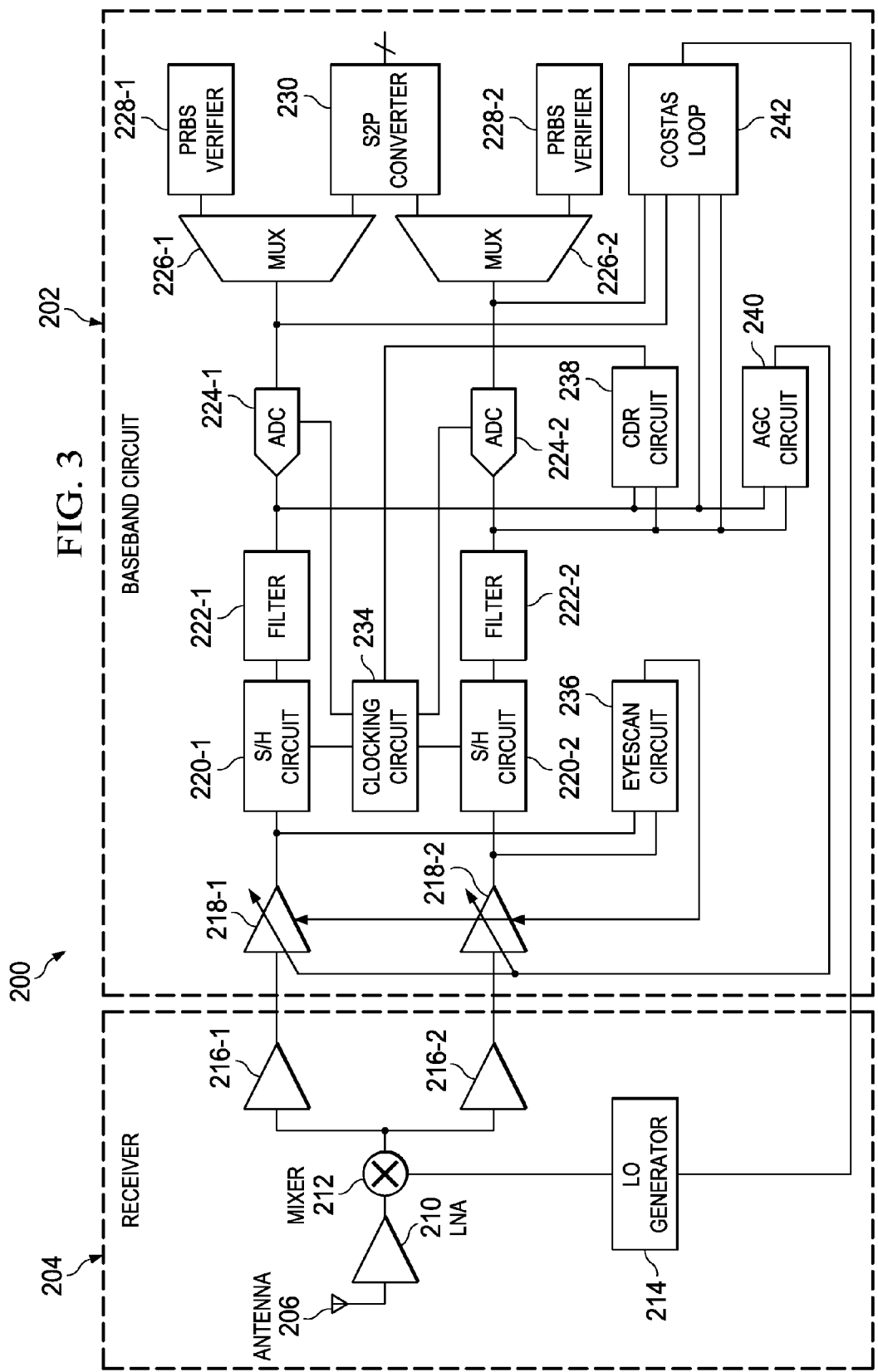
Figure 4:
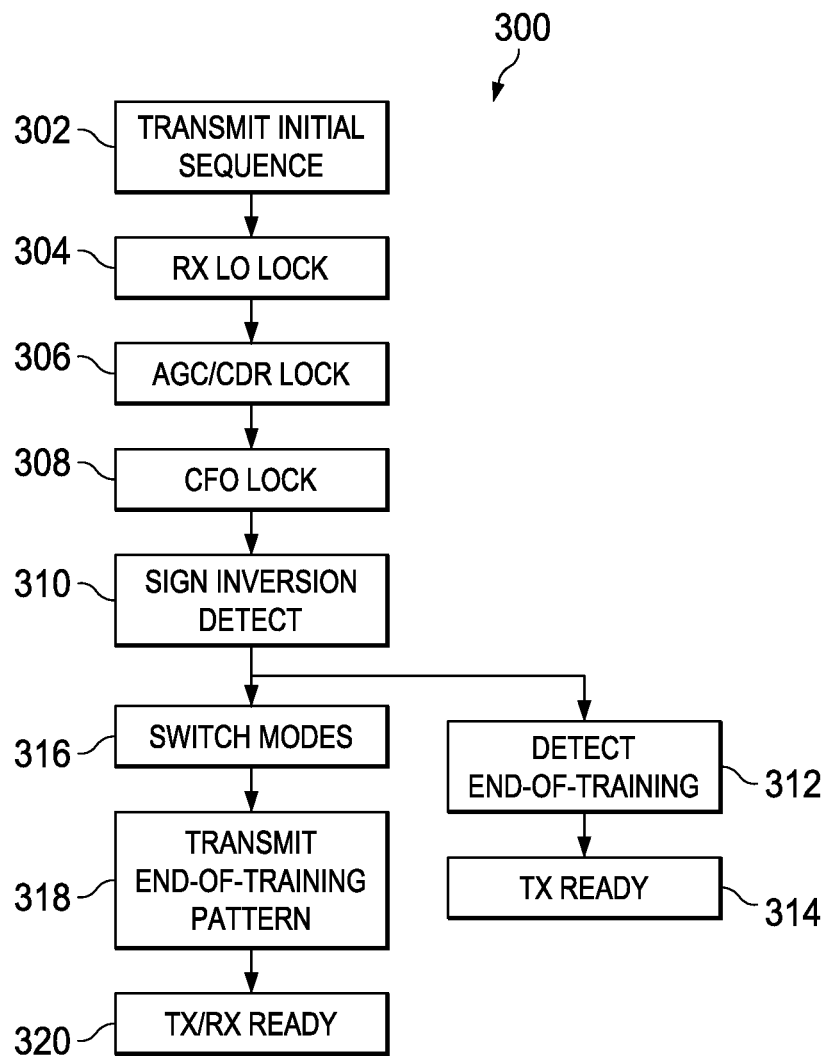
FIG. 4 is a diagrams of examples of initialization sequence for the system of FIG. 1.

In FIGS. 2 and 3, an example of an IO system can be seen in greater detail. In this example, there is a transmitter portion 100 and a receiver portion 200 that are able to communicate with one another. Specifically, this example IO system allows for communication between the transmitter portion 100 and receiver portion 200 through millimeter waves (i.e., wavelengths between about 0.1 mm and 10 mm). Alternatively, optical communication (e.g. through an optical fiber) may be employed. As another alternative, to allow more efficient two-way communications, the transmitter portion 100 and receiver portion 200 can be integrated together on each side (as shown in FIG. 1) within one or more integrated circuits (ICs) to form transceivers.

In operation normal, the baseband circuit 102 is able to generate in-phase (I) and quadrature (Q) signals over two separate channels (i.e., the I channel and Q channel) so as to allow the transmitter 104 to transmit signals using, for example, an m-QAM scheme. A digital data signal is provided to the parallel-to-serial (P2S) converter so as to be serialized. The serialized output from the P2S converter is converted to an analog signal by digital-to-analog converters (DACs) 114-1 and 114-2 (which are clocked by the phase lock loop or PLL 116). For example, the digital data can be provided over an 8-bit bits at 10 Gbps (having a total of 80 Gbps), and, for example, the PLL 116 can generate about a 5 GHz signal from about a 100 MHz reference clock signal. The output from the DACs 114-1 and 114-2 (which can, for example, operate as I and Q channel DACs) can, for example, generate a two-bit 4-pulse amplitude modulation or 4-PAM signals. Amplifiers 118-1 and 118-2 operate to amplify, for example, the baseband I and Q signals from DACs 114-1 and 114-2. The outputs from amplifiers 118-1 and 118-2 can be mixed with a local oscillator or LO signal using mixer 120 (i.e., performing an upconversion). This local oscillator signal (which, for example, can be about 160 GHz) can be generated from PLL 126. Power amplifier (PA) 128 can then amplify the mixer 120 output that can be transmitted through antenna 106. The receiver 204 is then able to receive these radio frequency (RF) signals through antenna 206. A low noise amplifier (LNA) 210 is able to amplify the RF signal, and the mixer 212 and local oscillator (LO) generator 214 (which can, for example, be voltage controlled oscillator or VCO that can, for example, operate at about 160 GHz) can downconvert this RF signal so as to generate I and Q channel signals for amplifiers 216-1 and 216-2.

Once the I and Q signals have been generated by receiver 204, baseband circuit 202 is able to recover both the clock and data. Typically, the I and Q signals are equalized and digitized (e.g., with ADCs 224-1 and 224-2) so as to produce parallel data for a bus with the serial-to-parallel (S2P) converter 230. The equalization is generally performed by the continuous-time linear equalizers (CTLEs) 218-1, sample-and-hold (S/H) circuits 220-1 and 220-2, and filters 222-1 and 222-2 (which can, for example, be finite impulse response or FIR filters). Typically, the eyescan circuit 236 (which can be comprised of two one-bit ADCs operating with about a 5 GHz clock) monitors the outputs of CTLEs 218-1 and 218-2 so as to provide adjustments top the CTLEs 218-1 and 218-2 and filters 222-1 and 222-2 to maintain a proper or desired eye-opening. The automatic gain control (AGC) circuit 240 (which can, for example be comprised of two one-bit ADCs operating with about a 5 GHz clock) can monitor the output from filters 222-1 and 222-2 to provide automatic gain control for CTLEs 218-1 and 218-2. The clocking circuit 324 (which can be comprised of a PLL that can receive about a 100 MHz reference signal and a delay locked loop or DLL that can provide 48 phases of about a 5 GHz clock) is able to provide clock signals to the S/H circuits 220-1 and 220-2, ADCs 224-1, 224-2, eyescan circuit 236, CDR circuit 238, and AGC circuit 240.

Figure 5:
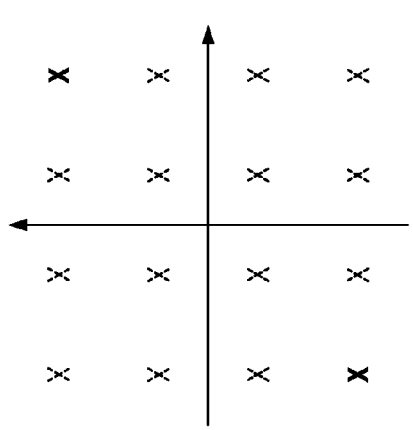
FIG. 5 is a diagram depicting an example of an initial bit sequence.

This IO system also has an initialization sequence 300 (as shown in the example of FIG. 3) that is dependent on that state of the receiver 200. During the initialization sequence multiplexers 112-1 and 112-2 are set such that the generators 110-1 and 110-2 can generate an initial bit sequence in that can be transmitted in step 302. Typically, and for example, this initial bit sequence is a pseudorandom bit sequence-7 (PRBS7). An example of such a PRBS7 sequence can be seen in FIG. 5. While it is not necessary to use a PRBS7 sequence, it is convenient because such a sequence can allow for AGC and CDR to be performed in the presence of carrier offset due at least in part to the constellation (which can be seen in FIG. 5) associated with PBRS7 that allows for the I and Q channels to have maximums that are 180° out-of-phase with one another (as shown, for example, in FIG. 6). Once the initial bit sequence has been transmitted, the receiver 200 (and, more specifically, the local oscillator generator 214) can lock to a local reference frequency (which can be generated, for example, with a crystal oscillator) in step 304. This can bring the carrier offset to within a few hundred part-per-million. Once this initial LO lock has been achieved, the baseband circuit 202 (e.g., eyescan circuit 236, CDR circuit 238, and AGC circuit 240) can achieve AGC/CDR lock in step 306. With a stable AGC/CDR, the Costas loop 242 can be gradually activated while the local phase locked loop or PLL (e.g., LO generator 214) can be deactivated or turned off. The Costas loop 308 can then perform carrier frequency offset (CFO) correction to achieve carrier lock in step 308. Similar with multiplexers 112-1 and 112-2, multiplexers 226-1 and 226-2 are set to provide data to verifiers 228-1 and 228-2. If PRBS7 (which can have a maximum run length of 7 for "1" and 6 for "0") is employed, sign inversion detection in step 310 can be easily performed. The receiver 200 can then wait for an end-of-training pattern to be detected in step 314, and the transmitter 100 is then ready (i.e., being synchronized with receiver 200) in step 314. Alternatively, in step 316, when the sign inversion has been detected, modes can be switched. For example, the first communications mode can be a binary phase-shift keying (BPSK) mode, where PBRS7 is a π/4 BPSK sequence, and the second communications mode can, for example, be a 16-quadrature amplitude modulation (16-QAM) mode. Once a settling time has lapsed, an end-of-training pattern can be transmitted in step 318; the pattern in step 318 can be the same or different from that in step 312. This pattern (in step 318) can be repeated multiple times and can, for example, be a PRBS7+1 sequence with a maximum run length of 8 for "1." Once completed, both the transmitter 100 and receiver 200 should be ready.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. A method comprising:
a) receiving an initial bit sequence by a receiver;
b) locking a local oscillator to a local reference;
c) performing automatic gain control (AGC) on the received initial bit sequence;
d) performing clock and data recover (CDR)
e) activating a Costas loop so as to achieve carrier frequency offset (CFO) lock;
f) detecting sign inversion;
g) synchronizing the receiver with an end-of-training pattern;
h) detecting the end-of-training pattern;
wherein the receiver further comprises a transceiver, and wherein the end-of-training pattern further comprise a first end-of-training pattern, and wherein the receiver is operating in a first communications mode prior to the step of synchronizing, and wherein the step of synchronizing further comprises:
switching to a second communication mode by the transceiver; and
transmitting a second end-of-sequence pattern.

2. The method of claim 1, wherein the first and second end-of-training patterns are the same pattern.

3. The method of claim 1, wherein the first communications mode is a binary phase-shift keying (BPSK), and wherein the second communications mode is quadrature amplitude modulation (QAM).

4. The method of claim 3, wherein the initial bit sequence is a pseudorandom bit sequence (PRBS) signal.

5. The method of claim 4, wherein the PRBS signal is a PRBS7 signal, and wherein the second communications mode is 16-QAM.

6. A method comprising:
performing an initialization between a transmitter and a receiver over a wireless link by:
a) transmitting an initial bit sequence by the transmitter;
b) receiving an initial bit sequence by a receiver;
c) clocking the local oscillator to a local reference;
d) performing ADC once the local oscillator is locked;
e) performing CDR;
f) activating a Costas loop so as to achieve CFO lock by the receiver;
g) detecting sign inversion by the receiver;
h) synchronizing the receiver with the transmitter with an end-of-training pattern; and communicating data from between the transmitter and the receiver over the wireless link;
i) transmitting the end-of-training pattern by the transmitter; and
j) detecting the end-of-training pattern by the receiver;
wherein the transmitter further comprises a first transceiver, and wherein the receiver further comprises a second transceiver, and wherein the end-of-training pattern further comprise a first end-of-training pattern, and wherein the first and second transceivers are operating in a first communications mode prior to the step of synchronizing, and wherein the step of synchronizing further comprises:
switching to a second communication mode by the second transceiver; and
transmitting a second end-of-sequence pattern to the first transceiver.

7. The method of claim 6, wherein the first and second end-of-training pattern are the same pattern.

8. The method of claim 6, wherein the first communications mode is BPSK, and wherein the second communications mode is QAM.

9. The method of claim 8, wherein the initial bit sequence is a PRBS signal.

10. The method of claim 9, wherein the PRBS signal is a PRBS7 signal, and wherein the second communications mode is 16-QAM.

11. An apparatus comprising:
a receiver having a local oscillator, an in-phase (I) channel, and a quadrature (Q) channel;
a baseband circuit having:
a first equalizer that is coupled to the I channel;
a second equalizer that is coupled to the Q channel;
a Costas loop that is coupled to the first and second equalizers;
a first analog-to-digital converter (ADC) that is coupled to the first equalizer;
a second ADC that is coupled to the second equalizer;
a first verifier that is coupled to the first ADC; and
a second verifier that is coupled to the second ADC;
wherein the receiver is configured to a) receive an initial bit sequence;
wherein the local oscillator is configured to be b) locked initially to a local reference and subsequently to a received signal using the initial bit sequence;
wherein the first and second equalizers are c) configured to perform AGC once the local oscillator is locked to the local reference;
wherein the Costas loop is d) configured to achieve CFO; and
wherein the first and second verifiers are e) configured to detect sign inversion.

12. The apparatus of claim 11,
wherein the first equalizer further comprises:
a first continuous-time linear equalizer (CTLE) that is coupled to the I channel;
a first sample-and-hold (S/H) circuit that is coupled to the first CTLE; and
a first filter that is coupled to the first S/H circuit; and
wherein the second equalizer further comprise:
a second CTLE that is coupled to the Q channel;
a second S/H circuit that is coupled to the second CTLE; and
a second filter that is coupled to the second S/H circuit.

13. The apparatus of claim 12, wherein the baseband circuit further comprises:
- a clocking circuit that is coupled to the first and second S/H circuits; and
- a clock-data recovery circuit that is coupled to the clocking circuit, the first filter, and the second filter.

14. The apparatus of claim 13, wherein the apparatus further comprises a transmitter that is coupled to the baseband circuit.

* * * * *